(12) United States Patent
Blagojevic et al.

(10) Patent No.: US 12,687,669 B1
(45) Date of Patent: Jul. 21, 2026

(54) PLASMONIC STRUCTURED COLOR FILTERS FOR HYPERSPECTRAL DETECTION

(71) Applicant: United States of America as represented by the Administrator of NASA, Washington, DC (US)

(72) Inventors: Branimir Blagojevic, Greenbelt, MD (US); Manuel A. Quijada, Greenbelt, MD (US); David Carnahan, Waltham, MA (US); Krzysztof Kempa, Chestnut Hill, MA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 286 days.

(21) Appl. No.: 18/526,493

(22) Filed: Dec. 1, 2023

(51) Int. Cl.
*G02B 5/20* (2006.01)
*G02B 5/00* (2006.01)

(52) U.S. Cl.
CPC ............. *G02B 5/208* (2013.01); *G02B 5/008* (2013.01); *G02B 5/201* (2013.01)

(58) Field of Classification Search
CPC ... G02B 5/20; G02B 5/00; G02B 5/26; G02B 5/208; G02B 5/201; G02B 5/008; G02B 5/18; G02B 5/1842; G02B 5/1857; G02B 5/1828; G02B 5/1819; G02B 5/1847; G02B 1/00; G02B 1/02; G02B 1/002; G02B 27/00; G02B 27/0037; G02B 27/42; G02B 27/4244; B82Y 10/00; B82Y 20/00; B82Y 30/00

USPC ............... 359/359, 360, 565, 566, 573, 576; 977/773, 774, 712, 721, 753
See application file for complete search history.

(56) References Cited

U.S. PATENT DOCUMENTS

2021/0255543 A1* 8/2021 Williams ............... G02B 5/201

OTHER PUBLICATIONS

Mudachathi et al. "Design of a colorimetric sensing platform using reflection mode plasmonic colour filters"; Proc. of SPIE vol. 10346, Aug. 2017, 103460D-1—103460D-6. (Year: 2017).*

* cited by examiner

*Primary Examiner* — Jie Lei
(74) *Attorney, Agent, or Firm* — Derek J. Langdon; Matthew F. Johnston; Trenton J. Roche

(57) ABSTRACT

The aspects of the disclosed embodiments are directed to a filter that includes a substrate, a dielectric layer disposed on the substrate in a pattern, leaving exposed portions of the substrate. A metallic layer is deposited over the dielectric layer and exposed portions of the substrate forming metallic structures over the exposed portions of the substrate and complementary metal patterns on the dielectric layer. A face of the filter is configured in a complimentary square checkerboard pattern, alternating between the metallic structures over the exposed portions of the substrate and complementary metal patterns on the dielectric layer. The filter is configured to operate when wavelengths of light impinge upon the checkerboard face of the filter and excite the metallic structures that are patterned atop the dielectric layer.

8 Claims, 6 Drawing Sheets

100

PLASMONIC STRUCTURED COLOR FILTERS FOR HYPERSPECTRAL DETECTION

ORIGIN OF THE INVENTION

Invention by Government Employee(s) Only

The invention described herein was made by one or more employees of the United States Government, and may be manufactured and used by or for the Government for governmental purposes without the payment of any royalties thereon or therefore.

FIELD

The aspects of the disclosed embodiments relate generally to tunable plasmonic filter structures for use in the near-infrared (NIR) to mid-infrared spectral regions. In particular, the aspects of the disclosed embodiments are directed to plasmonic nanostructures that serve as non-diffraction limited bandpass filters for near-infrared and infrared (IR) wavelengths.

BACKGROUND

The plasmonic in nature extraordinary optical transmission (EOT) effect was discovered by T. Ebbesen and demonstrated to be capable of subwavelength transmission, with ultra-short plasmon waves mediating light propagation through nanosized openings in metallic films, leading to various applications. It was also demonstrated that further EOT enhancement could be achieved with Babinet's complementary structures and the checkerboard structures. The checkerboard complementary structures could exhibit bandpass regions with high transparency (% Tmax) at specific wavelengths ($\lambda$ pass), with very sharp transitions as measured by the Full Width at Half Maximum (FWHM), and also good out of band rejection (% Tmin). However, hyperspectral filtering at the micrometer scale is not attainable.

The filtering of optical and infrared light can be accomplished by Fabry-Perot style filters. However, such filters are fabricated from multiple layers, which change thickness with temperature.

Plasmonic effects in nanoscale structures like checkerboards let some wavelengths pass through, while rejecting other wavelengths. Experimental results were affected by inhomogeneity broadening and damping due to processing imperfections. Cryogenic temperatures can also have a negative impact.

Accordingly, it would be desirable to provide a plasmonic nanostructure device that addresses at least some of the problems described above.

SUMMARY

The aspects of the disclosed embodiments are directed to plasmonic nanostructures that will serve as non-diffraction limited bandpass filters for near-infrared (NIR) and infrared (IR) wavelengths. The plasmonic nanostructure of the disclosed embodiments will exhibit high bandpass, strong out of band rejection, and sharp band edges. This and other advantages of the disclosed embodiments are provided substantially as shown in, and/or described in connection with, at least one of the figures, as set forth in the independent claims. Further advantageous modifications can be found in the dependent claims.

According to a first aspect the disclosed embodiments are directed to a plasmonic nanostructure filter device. In one embodiment, the filter device has a substrate; a dielectric layer disposed on the substrate in a pattern, the pattern configured to leave exposed portions of the substrate; a metallic layer deposited over the dielectric layer and exposed portions of the substrate forming metallic structures over the exposed portions of the substrate and complementary metal patterns on the dielectric layer.

In a possible implementation form, the metallic structures and complementary metal patterns form a checkerboard pattern across a face of the filter.

In a possible implementation form, the metallic structures and complementary metal patterns of the checkerboard pattern across the face of the filter are offset from one another in a vertical direction.

In a possible implementation form, the checkerboard pattern includes an array of metallic structures and an array of complementary metallic structures.

In a possible implementation form, the filter is configured to operate when certain wavelengths of light impinge upon the checkerboard pattern face of the filter and excite the metallic structures that are patterned atop the dielectric layer.

In a possible implementation form, the metallic structures form a first array and the complementary metal patterns form a second array, the first array and the second array being spatially offset in a vertical direction.

In a possible implementation form, the first array is configured to rest on micro-pillars and the second array is disposed in spaces between the micro-pillars.

In a possible implementation form, the substrate is a transparent substrate.

According to a second aspect, the disclosed embodiments are directed to a method of forming a plasmonic filter. In one embodiment, the method includes depositing a substrate; depositing a dielectric layer on the substrate in a pattern, the pattern configured to leave exposed portions of the substrate; depositing a metallic layer over the dielectric layer and exposed portions of the substrate to form metallic structures over the exposed portions of the substrate and complementary metal patterns on the dielectric layer.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

In the following detailed portion of the present disclosure, the aspects of the disclosed embodiments will be described in more detail with reference to the example embodiments shown in the drawings, in which.

DETAILED DESCRIPTION

The following detailed description illustrates exemplary aspects of the disclosed embodiments and ways in which they can be implemented. Although some modes of carrying out the aspects of the disclosed embodiments have been disclosed, those skilled in the art would recognize that other embodiments for carrying out or practicing the aspects of the disclosed embodiments are also possible.

The aspects of the disclosed embodiments are directed to plasmonic non-diffractive optical structures that are configured to work as sharp, high-quality color filters. The structures or devices can be used in for highly integrated space instruments and feature spectral selectivity at the micrometer scale, applicable to the detector pixels of Photodiode Array Detectors (PDA).

Figure 1:
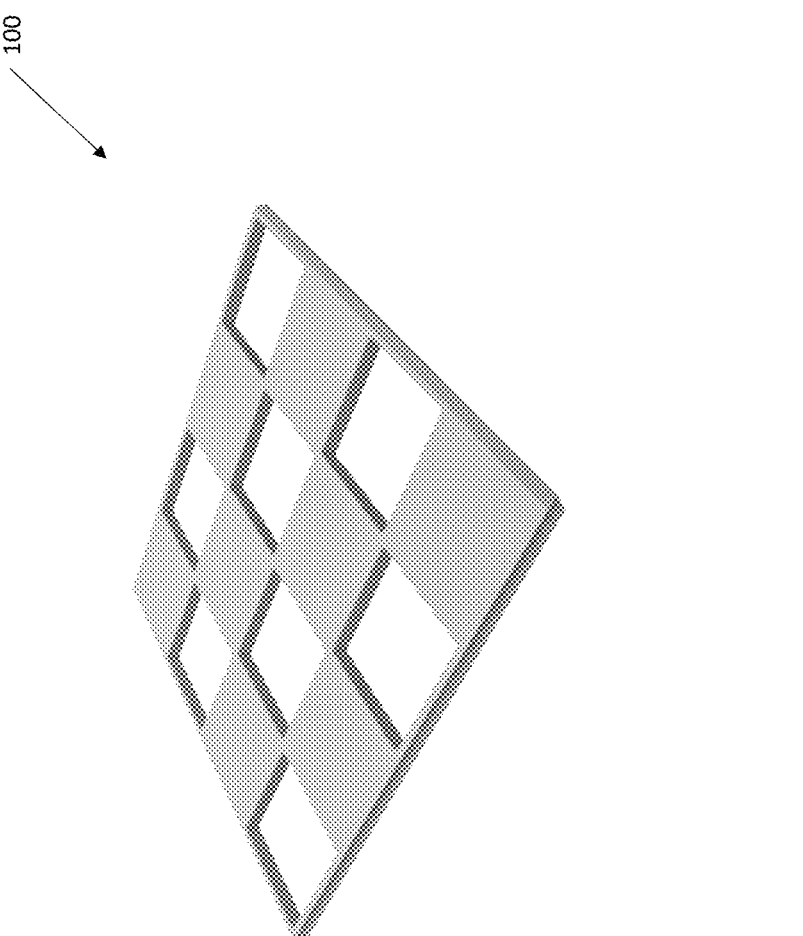
FIG. 1 is a schematic view of an exemplary plasmonic filter incorporating aspects of the disclosed embodiments.

FIG. 1 illustrates an exemplary filter structure or device 100 incorporating aspects of the disclosed embodiments. For purposes of the description herein, the filter device 100 will generally be referred to as filter 100. The filter 100 of the disclosed embodiments generally includes coupled, spatially (vertically) off-set Babinet complementary checkerboard arrays 102. One array 104 is configured to rest on micro-pillars 106, while a complementary array 108 is located in the spaces 110 between the micro-pillars 106.

Figure 2:
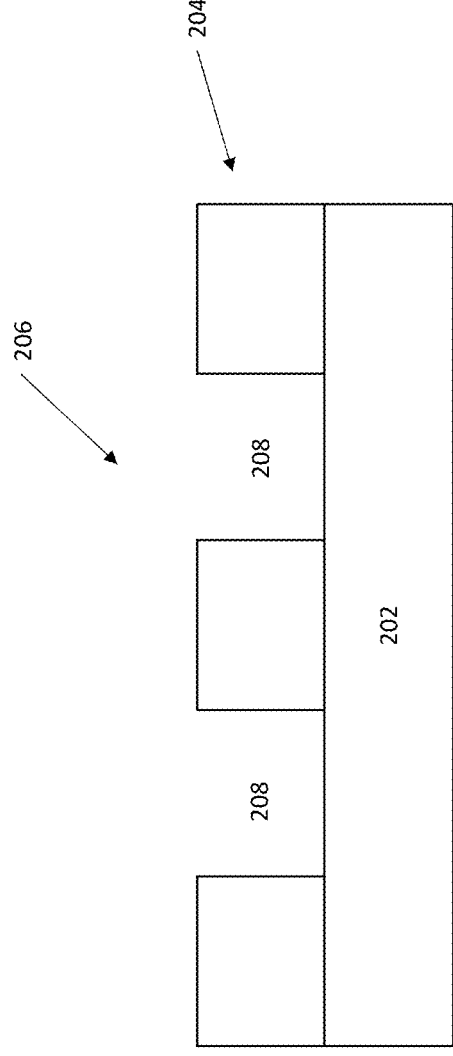
FIGS. 2 through 4 are schematic views illustrating aspects of the formation of an exemplary plasmonic filter incorporating aspects of the disclosed embodiments.

Referring to FIG. 2, in one embodiment, the filter 100 of the disclosed embodiments generally comprises a substrate 202. In one embodiment, the substrate 202 is transparent. A dielectric layer 204 is deposited on the transparent substrate 202. In one embodiment, the dielectric layer 204 is deposited on the transparent substrate in a pattern 206. The pattern 206 can include or provide for exposed portions 208 of the substrate 202, the remaining portions referred to as the patterned portions 206.

Figure 3:
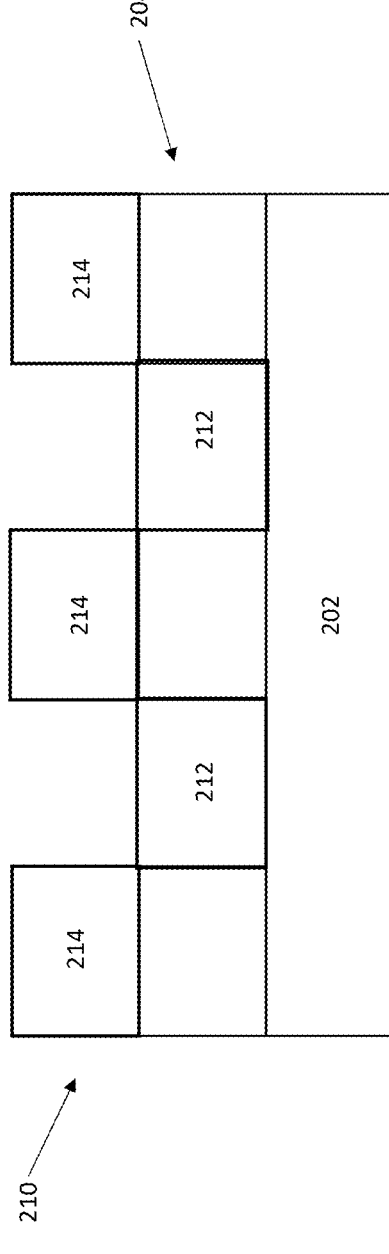

As is illustrated in FIG. 3, a metal layer 210 is deposited upon both the exposed portions 208 of the substrate 202 and the patterned portions 206 on the dielectric layer 204. The portions of the metal layer 210 deposited on or in the exposed portions 208 of the dielectric layer 204 will generally be referred to herein as metallic structures 212. The portions of the metal layer 210 on the patterned portions 206 of the dielectric layer 104 are referred to as complementary metal pattern 214. The portions of the metal layer 210 that are deposited in the exposed portions 208 of the substrate 202 and the patterned portions 206 of the dielectric layer 204 are configured to complement each other.

Figure 4:
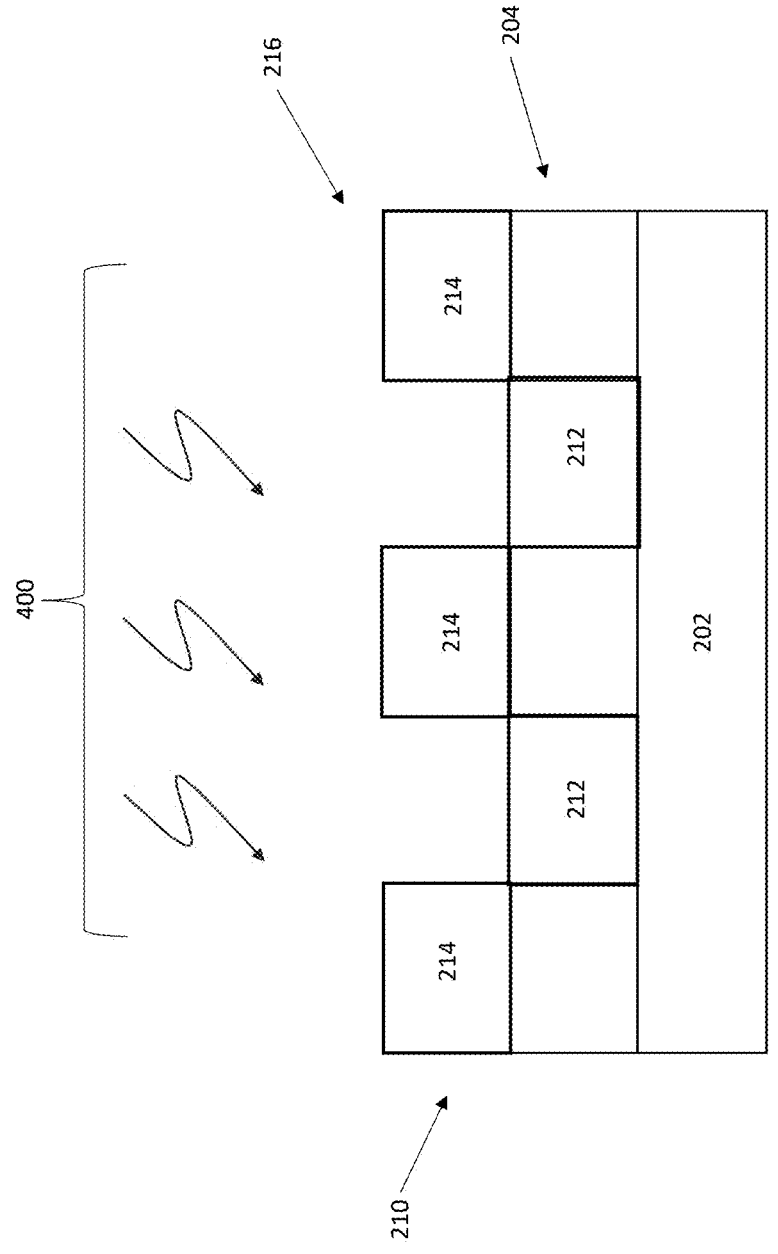

Referring to FIG. 4, the filter 100 of the disclosed embodiments is configured to operate when certain wavelengths of light 400 impinge upon one face 216 of the filter 100 and excite the metallic structures 212 that are patterned atop the dielectric layer 204. The excitation couples to the complementary metal pattern 214 on the layer atop the substrate 202 across the thickness of the dielectric layer 204. This interplay leads to the transmission of certain wavelengths through the filter 200.

Figure 5:
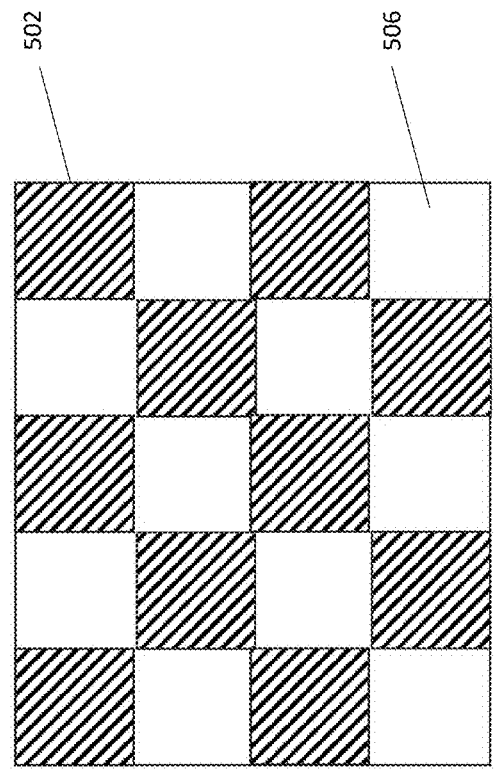
FIG. 5 is a schematic top view of an exemplary plasmonic filter incorporating aspects of the disclosed embodiments.
Figure 6:
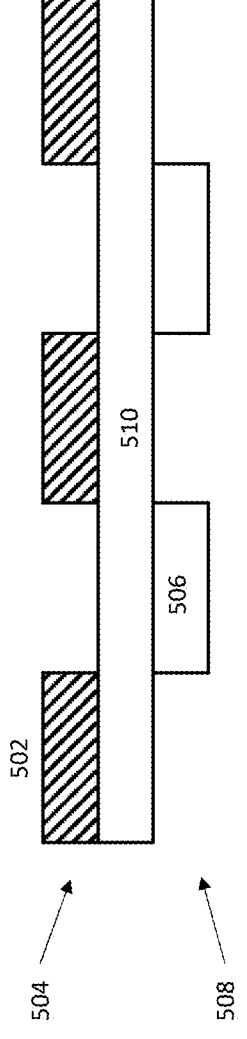
FIG. 6 is a schematic view illustrating aspects of an exemplary plasmonic filter incorporating aspects of the disclosed embodiments.

As is shown in FIG. 5, in one embodiment, the face 216 of the filter 100 is configured in a complimentary square checkerboard pattern 500. In alternate embodiments, the filter 100 can be configured in any suitable pattern, other than including a square checkerboard pattern. For example, alternate embodiments can include other complementary patterns, such as for example, rectangular two layer checkerboards and other complementary structures.

In the example of FIG. 5, the squares 502 generally represent the metallic structures 212 of FIG. 4, while the squares 506 generally represent the complementary structures 214. As shown in FIG. 5, the metal squares 502 at one level 504 are vertically offset from the complementary metal squares 506 at another level 508. A dielectric layer 510 vertically separates the metal squares 502 at the one level 504 from the complementary metal squares 506 at the another level 508.

The dielectric layer 510 can be patterned or be continuous. The size of the checkerboards, the thickness of the dielectric layer 510 and the properties of the dielectric layer 510 are configured to influence the wavelength passed by the filter 100. The vertical geometrical projection yields a complete shading, and so the extraordinary optical transmission (EOT) action is enabled by the plasmons mediating the horizontal transmission between the square patches 502 of the top array 504 and the square patches 506 of the bottom array 508.

The aspects of the disclosed embodiments are configured to create non-diffraction-limited optical bandpass IR filters and directly deposit these upon hyperspectral detectors such as PhotoDiode Arrays (PDA's) or Charged Coupled Devices (CCD's) for spectral analysis at the focal plane. A pattern of specific-size nanostructures on a surface creates plasmonic effects that make it act as a filter. The filter device of the disclosed embodiments is less affected by angular and temperature fluctuations.

Investigations into nanoscale patterning of plasmonic structures have shown high potential to create game-changing new classes of nanostructure-based absorbers, reflectors, and bandpass transmission filters. This novel class of non-diffraction limited optics has the potential to significantly reduce the instrument mass and size and broaden our capability to make wavelength-selective measurements on the detector for nearly all optical and infrared instrumentation in future NASA mission concepts. Such devices would enable in-depth spectroscopic analysis, aligning with the requirements of future NASA missions such as the Large Ultraviolet Optical Infrared Surveyor (LUVOAR) and the Habitable Exoplanet Observatory (HabEx).

The plasmonic filter of the disclosed embodiments provides advantages over a Fabry Perot style filters. The advantages include, but are not limited to, high control of the spectral characteristics (peak locations and width), suppression of harmonics, low-frequency cut-off, etc. Given that the EOT filters' mode of operation is different from Fabry Perot style filters, the plasmonic filter of the disclosed embodiments will be relative insensitive to temperature and incoming angle. These two features will provide enhanced performance over the current state-of-the-art.

Another advantage of the plasmonic filter of the disclosed embodiments is that the spectral filtering capabilities can be used at the detector pixels level. This is currently not available with the current state-of-the-art of the interference filter technology.

The plasmonic nanostructure-based absorbers, reflectors, filters, and pigments as a new class of non-diffraction limited optics has the potential to significantly reduce the instrument mass and size and broaden capability to make wavelength-selective measurements for nearly all optical and infrared instruments planned on future NASA science missions targeting Earth, solar system and astrophysical objects. The industrial applications of the plasmonic filters of the disclosed embodiments are focused on the higher level of integration of commercial optoelectronics devices. This includes direct deposition of the plasmonic filters on various classes of optical detectors, including point detectors, 1D, and 2D detector arrays.

Thus, while there have been shown, described and pointed out, fundamental novel features of the invention as applied to the exemplary embodiments thereof, it will be understood that various omissions, substitutions and changes in the form and details of devices and methods illustrated, and in their operation, may be made by those skilled in the art without departing from the spirit and scope of the presently disclosed invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A plasmonic filter comprising:
a substrate;
a dielectric layer disposed on the substrate as a continuous layer;
a metallic layer deposited over the dielectric layer in a checkerboard pattern forming a top array of metallic structures and in a complementary checkerboard pattern forming a bottom array of complementary metallic structures, wherein the dielectric layer vertically separates the top array of metallic structures from the bottom array of complementary metallic structures.

2. The plasmonic filter according to claim 1, wherein the filter is configured to operate when wavelengths of light impinge upon the checkerboard pattern face of the filter and excite the top array of metallic structures.

3. The plasmonic filter according to claim 2, wherein horizontal transmission of light between the top array of metallic structures is reduced by plasmons generated by the excitation of the top array.

4. The plasmonic filter according to claim 1, wherein the substrate is a transparent substrate.

5. The plasmonic filter according to claim 1, wherein the plasmonic filter is directly deposited upon a hyperspectral detector.

6. A method of forming a plasmonic filter, the method comprising:
depositing a substrate;
depositing a dielectric layer on the substrate in a continuous layer;
depositing a metallic layer over the dielectric layer in a checkerboard pattern forming a top array of metallic structures and in a complementary checkerboard pattern forming a bottom array of complementary metallic structures,
wherein the dielectric layer vertically separates the top array of metallic structures from the bottom array of complementary metallic structures.

7. The method according to claim 6, wherein the filter is configured to operate when wavelengths of light impinge upon the checkerboard pattern face of the filter and excite the top array of metallic structures.

8. The method according to claim 6, wherein the substrate is a transparent substrate.

* * * * *